(12) United States Patent
Triebel et al.

(10) Patent No.: US 10,014,685 B2
(45) Date of Patent: Jul. 3, 2018

(54) METHOD AND DEVICE FOR REGULATING THE CHARGE STATE OF A BATTERY POWER PLANT

(71) Applicant: Younicos AG, Berlin (DE)

(72) Inventors: Clemens Triebel, Berlin (DE); Carsten Reincke-Collon, Berlin (DE); Udo Berninger, Berlin (DE)

(73) Assignee: YOUNICOS AG, Berlin (DE)

( * ) Notice: Subject to any disclaimer, the term of this patent is extended or adjusted under 35 U.S.C. 154(b) by 361 days.

(21) Appl. No.: 14/784,546

(22) PCT Filed: Apr. 16, 2014

(86) PCT No.: PCT/EP2014/057731
§ 371 (c)(1),
(2) Date: Oct. 14, 2015

(87) PCT Pub. No.: WO2014/170373
PCT Pub. Date: Oct. 23, 2014

(65) Prior Publication Data
US 2016/0079755 A1    Mar. 17, 2016

(30) Foreign Application Priority Data

Apr. 16, 2013   (DE) .......................... 10 2013 206 808

(51) Int. Cl.
    *H02J 3/28*    (2006.01)
    *H02J 3/32*    (2006.01)
(52) U.S. Cl.
    CPC ..................................... *H02J 3/32* (2013.01)
(58) Field of Classification Search
    CPC ........................................................ H02J 3/32
    See application file for complete search history.

(56) References Cited

U.S. PATENT DOCUMENTS 7,839,027 B2 * 11/2010  Shelton .................. H02J 3/32
                                                  307/102
8,839,027 B2    9/2014  Feder et al.
(Continued)

FOREIGN PATENT DOCUMENTS

DE      102011055232      5/2013

OTHER PUBLICATIONS

International Search Report dated Nov. 13, 2014 regarding PCT/EP2014/057731 (7 pages).
(Continued)

*Primary Examiner* — Jared Fureman
*Assistant Examiner* — Michael Warmflash
(74) *Attorney, Agent, or Firm* — Toler Law Group, PC

(57) ABSTRACT

In a method for controlling the state of charge (SOC) of a battery power plant (1), which for controlling at least one physical quantity (P, f) is connected to an electric energy distribution network (2), the state of charge (SOC) of the battery power plant (1) is detected for at least one physical quantity (P, f) of the energy distribution network (2) with a detection speed and/or detection accuracy which are greater than specified limit values for a minimum detection speed and detection accuracy of the physical quantity (P, f), and the electric power transfer between the battery power plant (1) and the energy distribution network (2) is determined by taking account of the difference between the actual and the specified control speed and control accuracy of the physical quantity (P, f) to be controlled as well as a difference between the actual and the specified height and rate of change of the power transfer between the battery power plant (1) and the energy distribution network (2).

20 Claims, 9 Drawing Sheets

(56) References Cited

U.S. PATENT DOCUMENTS

| | | | | |
|---|---|---|---|---|
| 8,914,158 B2* | 12/2014 | Geinzer | ............... | H02J 3/32 |
| | | | | 700/295 |
| 9,093,845 B2* | 7/2015 | Triebel | ............... | H02J 3/32 |
| 2011/0221276 A1* | 9/2011 | Geinzer | ............... | H02J 3/32 |
| | | | | 307/66 |
| 2014/0292080 A1 | 10/2014 | Markowz et al. | | |
| 2014/0327404 A1* | 11/2014 | Markowz | ............... | H02J 7/00 |
| | | | | 320/128 |

OTHER PUBLICATIONS

Transmission Code 2007 Netz und Systemregeln der deutschen Übertragungsnetzbetreiber, Aug. 2007, 91 pages.
International Preliminary Report on Patentability dated Oct. 29, 2015 (8 pages).

* cited by examiner

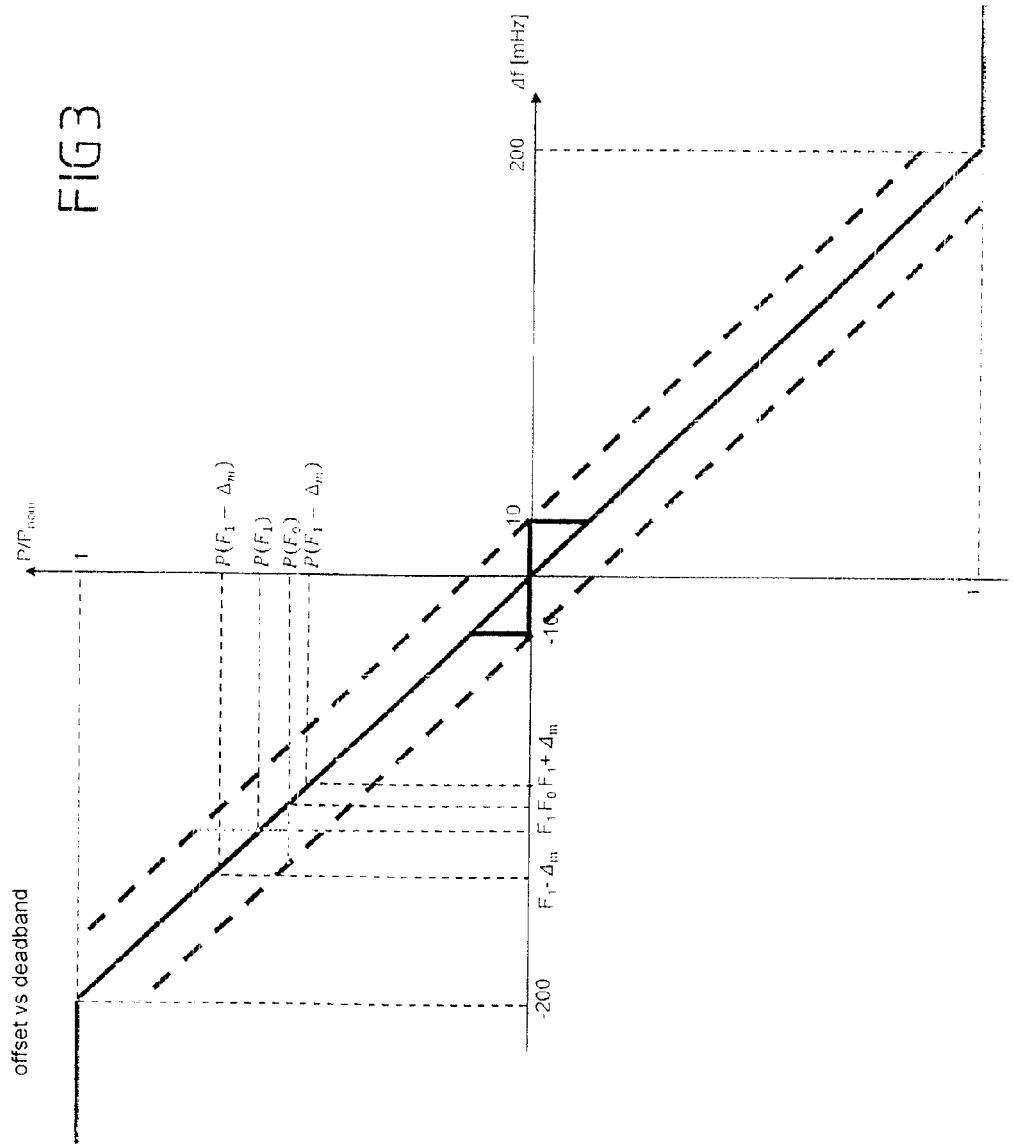

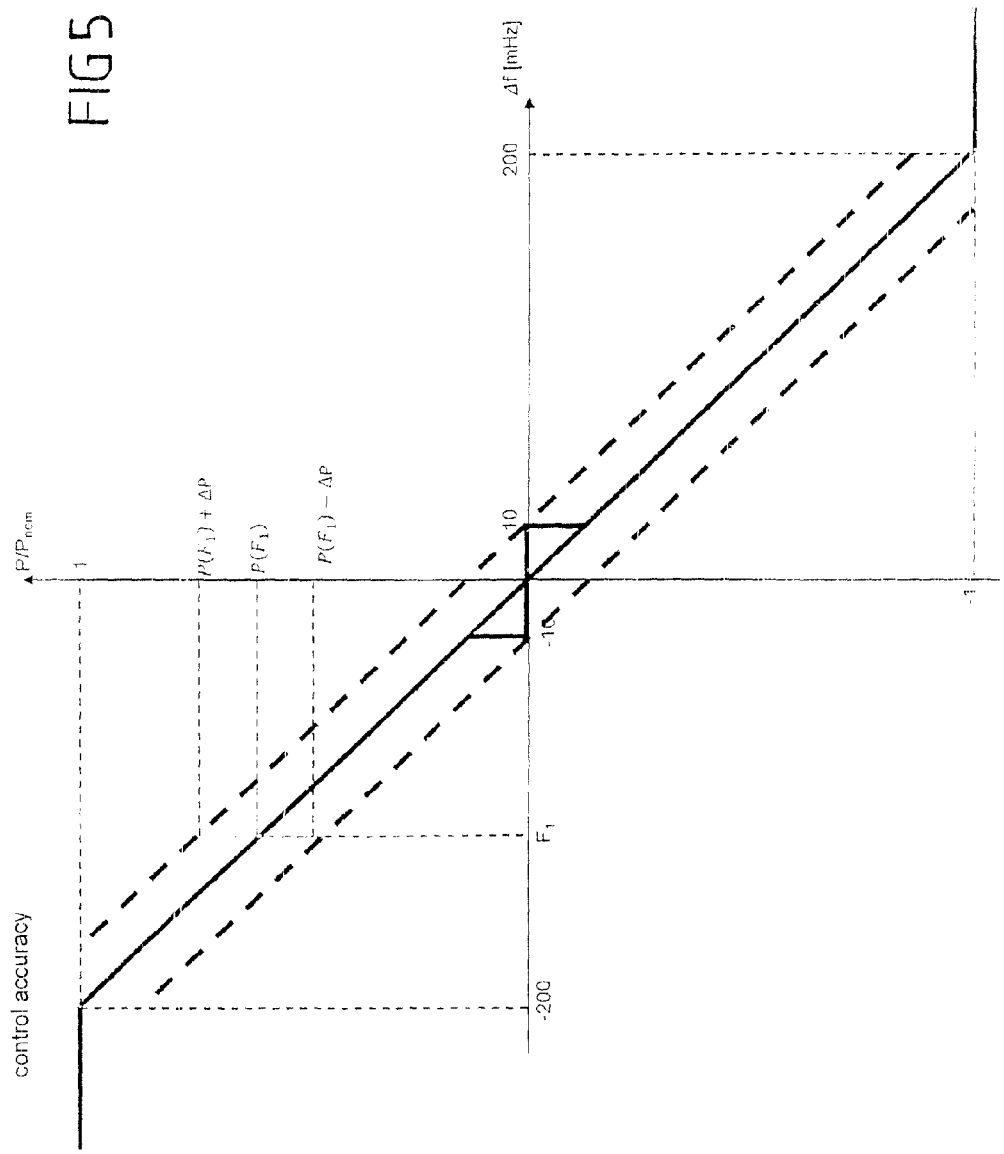

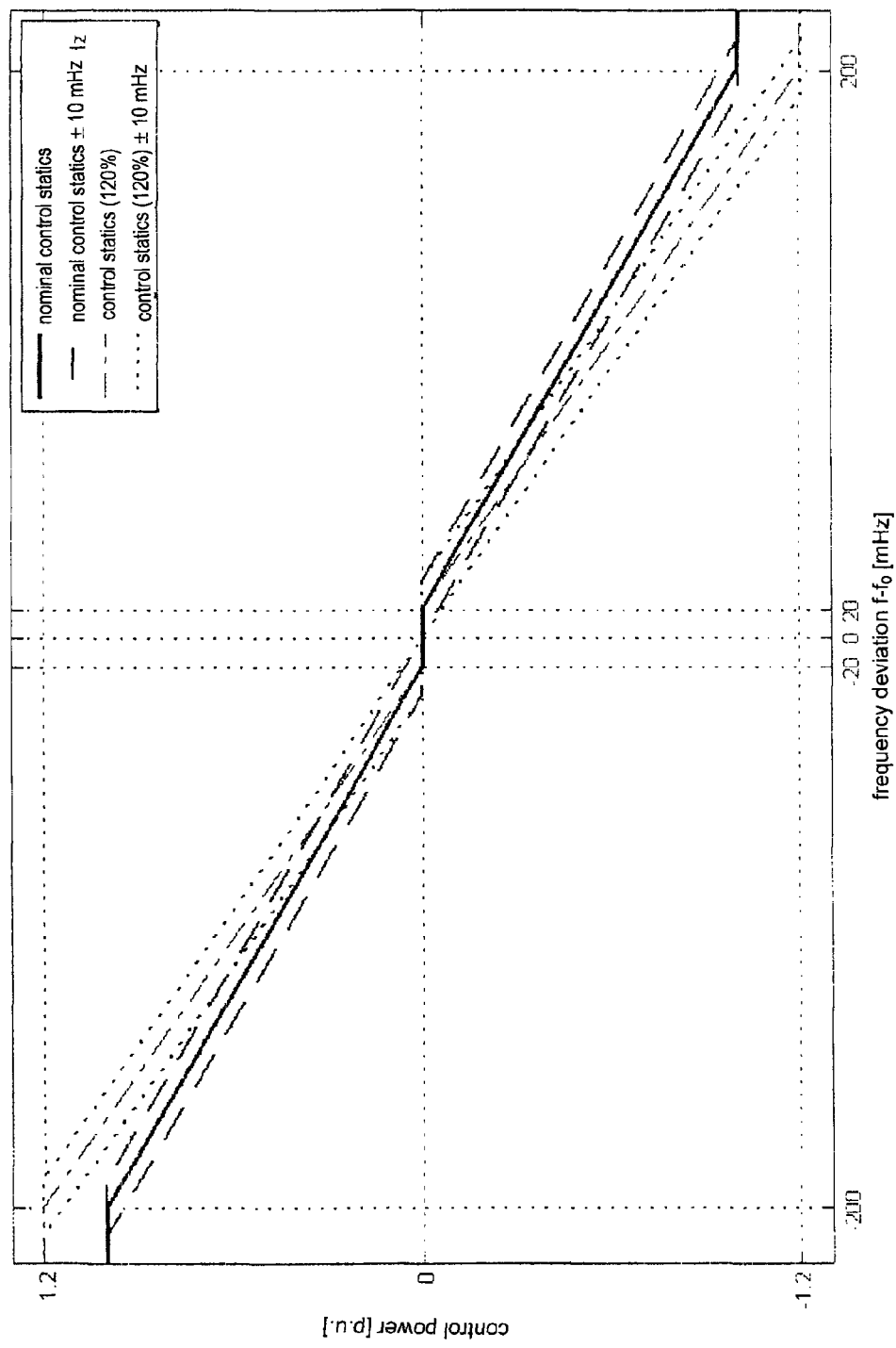

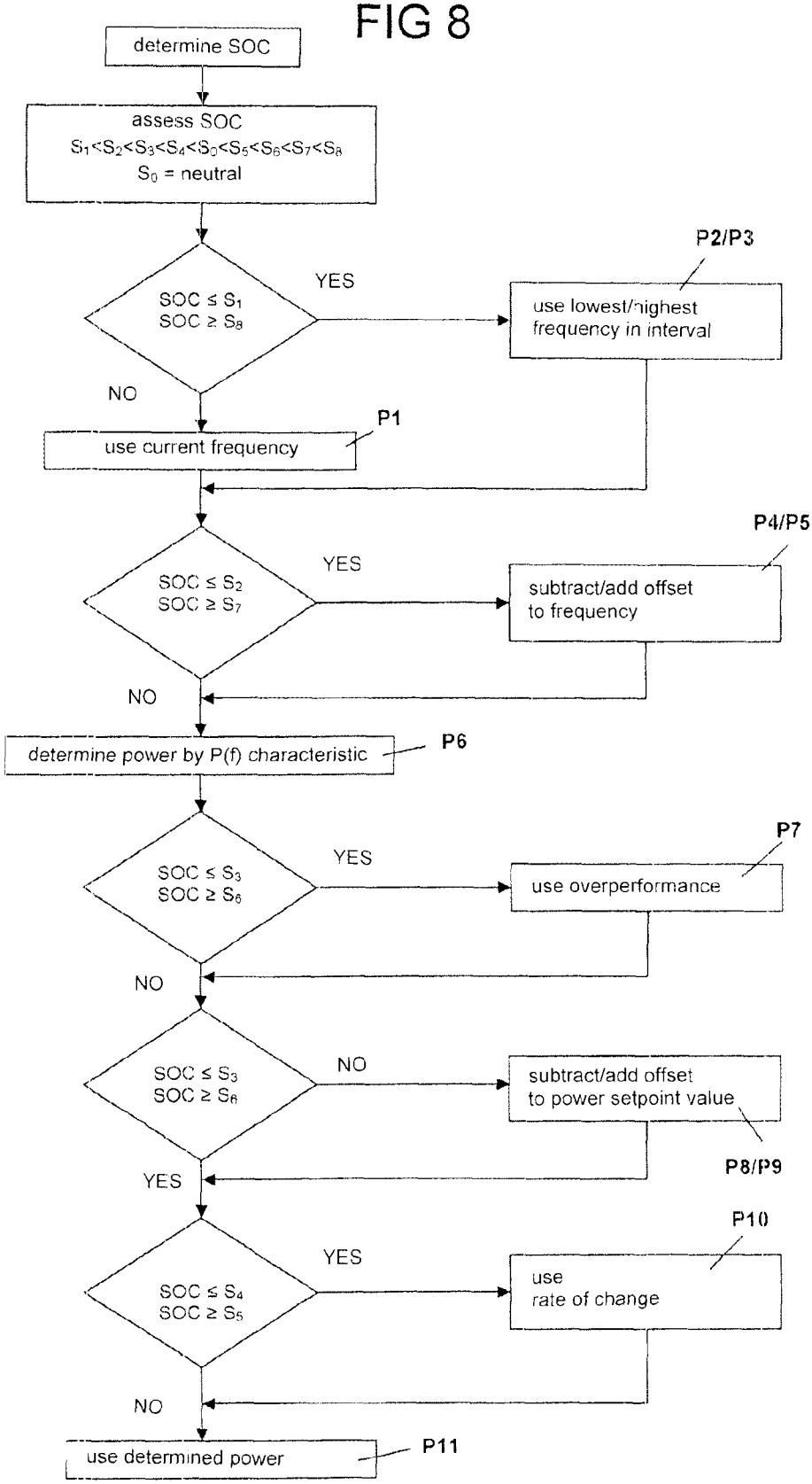

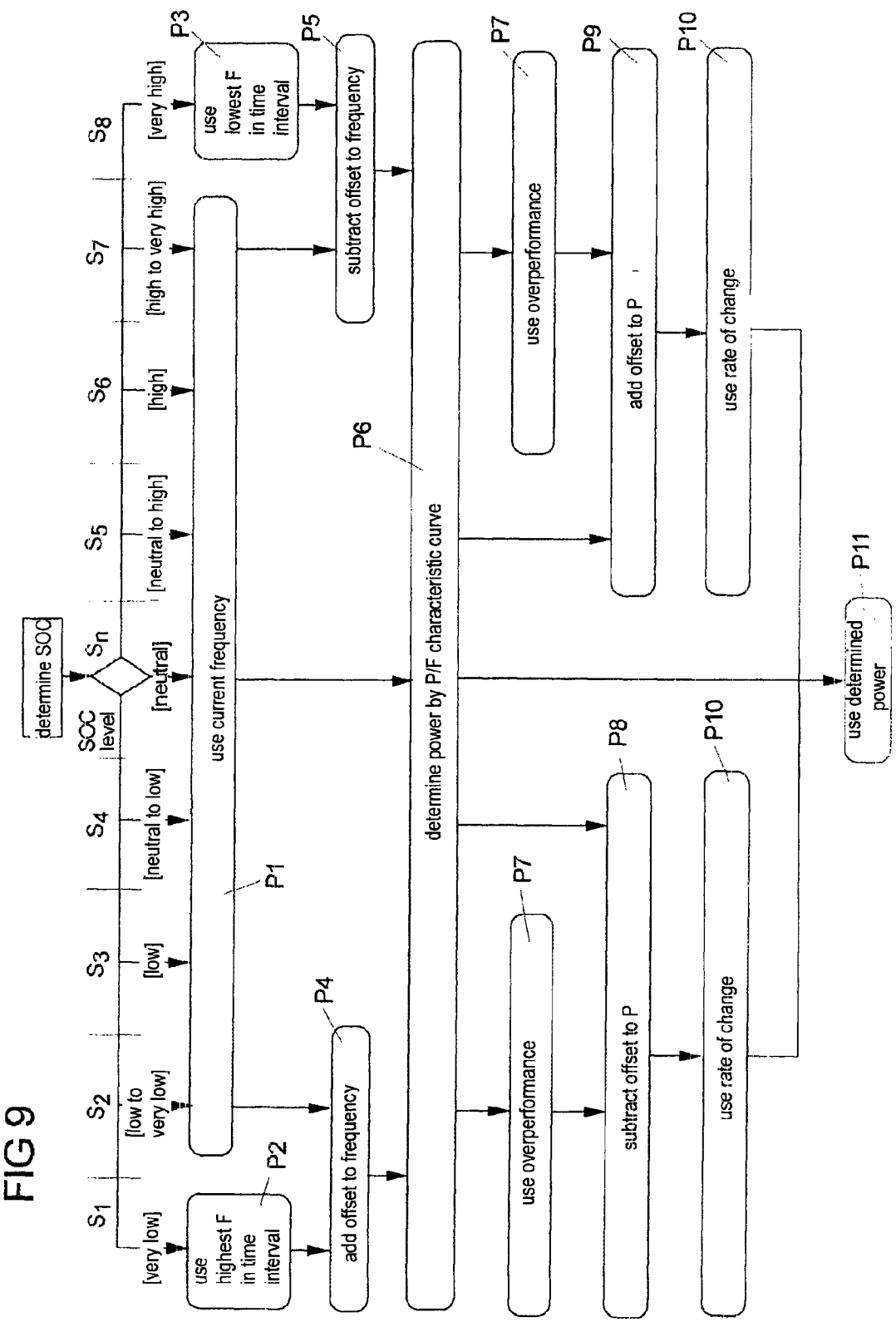

METHOD AND DEVICE FOR REGULATING THE CHARGE STATE OF A BATTERY POWER PLANT

CROSS-REFERENCE TO RELATED PATENT APPLICATIONS

This Application is a National Phase Entry of PCT Application No. PCT/EP2014/057731, filed Apr. 16, 2014, which claims the benefit of and priority to German Patent Application No. 102013206808.5, filed Apr. 16, 2013, the entire disclosures of which are incorporated by reference herein.

This invention relates to a method for controlling the state of charge of a battery power plant according to the generic part of claim 1 and to an apparatus for carrying out the method according to claim 19.

For controlling the grid voltage and grid frequency of electric energy distribution networks there are not only used conventional power plants with rotating electric generators, but also battery storage units in the megawatt range as part of an efficient control concept with centralized and decentralized control tasks. The battery storage units subsequently referred to as "battery power plant" differ from the energy storage units currently used for primary control in particular by their speed and good controllability in the provision of primary control power, and therefore are also connected to existing electric energy distribution networks and used for primary control. For this purpose, however, it is necessary that a battery power plant largely is in an optimum state of charge which for primary control ensures both the input of electric power from the electric energy distribution network and the output of electric power to the electric energy distribution network. This requirement necessitates a control or regulation of the state of charge of a battery power plant, which ensures an optimum state of charge without influencing the grid system service of the primary control by the battery power plant.

From U.S. Pat. No. 7,839,027 B2 a method and an apparatus for maintaining the state of charge (SOC) of a battery power plant energetically connected with an electric energy distribution network are known, with which as grid system service the grid frequency of an electric energy distribution network is controlled. For this purpose, it is determined whether the actual value of the grid frequency lies within a predetermined setpoint range. When the actual value of the grid frequency lies outside the setpoint range, the grid frequency is controlled by a corresponding energy transfer between the battery power plant and the electric energy distribution network. When the actual value of the grid frequency lies within the setpoint range, it is determined whether the state of charge of the battery power plant lies within specified limit values. When the same lies outside the specified limit values and when the actual value of the grid frequency lies within the specified setpoint range, an energy transfer is effected between the battery power plant and the electric energy distribution network with the aim of bringing the state of charge of the battery power plant into the specified limit value range.

In this method it is disadvantageous that charging or discharging of the battery power plant connected to the electric energy distribution network only is effected when the actual value of the grid frequency lies within the specified setpoint range. This involves the risk that due to the charging or discharging operation of the battery power plant the actual value of the grid frequency exceeds or falls below the specified setpoint limits, so that the charging or discharging operation must be stopped and the primary control of the grid frequency must be effected. For this reason, setting the optimum state of charge of the battery power plant can take an extended period and in the extreme case lead to the fact that the battery power plant no longer can fulfill its grid service due to the exceedance of state of charge limits.

The post-published document DE 10 2011 055 232 A1 proposes a method for providing control power for an electricity grid, in which an energy accumulator connected to the electricity grid supplies energy to the electricity grid in dependence on a frequency deviation from a setpoint frequency of the electricity grid and/or takes up energy from the electricity grid, wherein a deadband is specified around the setpoint frequency. The frequency deviation from the grid frequency is measured with a higher accuracy than the width of the deadband, and a band width within the deadband is chosen in dependence on a state of charge of the energy accumulator. For controlling the state of charge of the energy accumulator the band width within the deadband is utilized, whereas outside the band width control power is provided.

For a change of state of the energy accumulator this method utilizes a deadband variable due to an increased accuracy in the frequency measurement instead of the deadband specified by a grid operator, but only insufficiently exhausts the possibilities available in the provision of primary control power due to the speed and good controllability of battery power plants.

It is the object of the present invention to indicate a method for controlling the state of charge of a battery power plant as mentioned above, which independent of the primary control power to be provided by the battery power plant provides for maintaining an optimum (neutral) state of charge of the battery power plant by making use of the speed and good controllability of battery power plants in the provision of primary control power.

According to the invention, this object is solved by the features of claim 1.

The solution according to the invention provides for maintaining an optimum or neutral state of charge of the battery power plant independent of the primary control power to be provided by the battery power plant for an electric energy distribution network, which can consist of a power output to the energy distribution network or a power input from the energy distribution network. This ensures a safe operation of the battery power plant when providing a grid system service within the capacity of the battery power plant.

The term "electric energy distribution network" relates to a high-voltage transmission network or a medium-voltage distribution network, wherein a battery power plant connected to a distribution network at medium-voltage level can provide system services such as the primary power control in the high-voltage transmission network also directly via the distribution network level.

The solution according to the invention proceeds from the consideration that due to the speed and good controllability of battery power plants in the provision of primary control power, scopes for the provision of primary control power by the battery power plant can be utilized for maintaining an optimum state of charge of the battery power plant.

Since a power transfer between the electric energy distribution network and the battery power plant is effected in those areas in which the battery power plant provides primary control power, a counterproductive behavior of the battery power plant in the primary control is avoided and at the same time it is ensured that the optimum state of charge of the battery power plant is maintained for providing the primary control power.

Correspondingly, the method according to the invention for controlling the state of charge (SOC) of a battery power plant, which for controlling at least one physical quantity is connected to an electric energy distribution network, includes the following features:
- determining the state of charge (SOC) of a battery power plant,
- detecting the physical quantity of the electric energy distribution network with a detection speed or measurement frequency and detection accuracy, which are greater than specified limit values for a minimum detection speed and detection accuracy, and
- controlling the electric power transfer between the battery power plant and the electric energy distribution network by taking account of the difference between the actual and the specified detection speed and detection accuracy of the detected physical quantity.

As further instruments for maintaining an optimum state of charge of the battery power plant, the amount and rate of change of the power transfer between the battery power plant and the energy distribution network can be utilized, which due to the quickness and accuracy of the battery power plant in the provision of primary control power are greater than specified minimum limit values of the amount and rate of change of the power transfer, so that the power transfer can be effected by taking account of the difference of the actual and the specified amount and rate of change of the power transfer between the battery power plant and the energy distribution network.

Preferably, the determined state of charge of the battery power plant in relation to a specifiable state of charge is assessed from very low to very high, and the power transfer between the battery power plant and the energy distribution network is determined corresponding to a transfer strategy dependent on the assessment, which individually or in combination comprises
a. a selection of the most favorable value of the physical quantity dependent on the state of charge of the battery power plant within a specified temporal detection interval,
b. a subtraction or addition of an offset from or to the detected actual value of the physical quantity within specified measurement accuracy limits,
c. an overperformance of the power transfer,
d. a subtraction or addition of an offset within the specified accuracy of the power to be provided,
e. an increased transfer power gradient.

In the transfer strategy of the selection of the most favorable value of the grid frequency dependent on the state of charge (SOC) of the battery power plant within a specified detection interval, the highest frequency of the detection interval is utilized for charging the battery power plant and the lowest frequency of the detection interval is utilized for discharging the battery power plant.

Since the decision as to whether the highest frequency is used for charging or the lowest frequency is used for discharging the battery power plant depends on the state of charge of the battery power plant, the lowest frequency for example also can still be used for discharging the battery power plant, provided it is high enough. Correspondingly, at the grid frequency dependent on the state of charge of the battery power plant within a specified detection interval within the spectrum ranging from the lowest to the highest frequency determined, the most suitable frequency is used for determining the power to be provided by the battery power plant.

Due to the sluggishness of conventional power plants in their reaction to changes in frequency, an increased detection rate of the frequency or a higher measurement frequency generally is not relevant for the same. For a battery power plant with a distinctly higher speed of reaction to changes in frequency, a higher detection rate or detection of changes in frequency however is expedient. The same can either be utilized for the faster stabilization of the magnitude of the grid frequency to be controlled and thus reduce the total amount of the control energy to be provided or be used for controlling the state of charge of the battery power plant, wherein corresponding to the regulatory specifications the selective sluggishness does not exceed a required minimum reaction time or maximum sluggishness. Correspondingly, a faster frequency detection or measurement frequency as compared to the reaction speeds of conventional power plants defined by regulatory framework conditions provides for making use of the scope resulting from the admissible detection interval.

A faster frequency detection or measurement frequency as compared to the reaction speeds of conventional power plants defined by regulatory framework conditions thus provides for making use of the scope resulting from the admissible detection interval. Despite the provision of the primary control power, charging or discharging of the battery power plant can be utilized by selecting the most favorable value of the grid frequency within the specified interval.

In the transfer strategy of the increased measurement accuracy within a required measurement accuracy of the grid frequency, an offset dependent on the accuracy of the measurement of the grid frequency can be added to the measured grid frequency or be subtracted from the measured grid frequency, in order to determine the power to be provided by the battery power plant.

At a required measurement accuracy of the grid frequency of $\Delta_f$ and a measurement accuracy of at least $\Delta_m$ with $\Delta_f > \Delta_m$, an offset of maximally $\Delta_f - \Delta_m$ can be added to the detected grid frequency for charging the battery power plant, and for discharging the battery power plant an offset of maximally $\Delta_f - \Delta_m$ can be subtracted from the detected grid frequency.

In contrast to known methods utilizing an increased measurement accuracy, the development of the method according to the invention provides for using an offset, instead of a sliding variable deadband, for providing a primary control power. For example, at a required measurement accuracy of the grid frequency of 10 mHz an offset of up to 9 mHz can be added to the measured grid frequency or be subtracted from the same, in order to determine the power to be provided by the battery power plant, when the grid frequency is detected with a measurement inaccuracy of maximally 1 mHz, i.e. at a detection accuracy of ±1 mHz.

Since conventional power plants generally do not provide an arbitrary precision in the fulfillment of setpoint values when providing control power, minimum requirements are applicable in the provision of control power, which due to the speed and accuracy of the provision of power by a battery power plant lead to a difference between required control accuracy and possible control accuracy and hence to a power offset for the control power, which can be utilized for optimizing the state of charge of the battery power plant. The usable offset can both be constant, e.g. when the control accuracy is required in dependence on the nominal power of the power plant, or also dynamic, if the control accuracy is required in relation to the actual power of the power plant. When using this method, care should be taken that the power is not pushed above or below the power at nominal frequency.

The transfer strategy of the overperformance of the power transfer is provided within the limits of the specified requirement concerning the accuracy of the power transfer, wherein the percentage of the overperformance of the power transfer can be fixed, but does not exceed a regulation-related maximum amount of e.g. 20% of the setpoint value of the power of the energy distribution network, which results from the curve of the dependence of the power of the energy distribution network on the grid frequency.

By utilizing the relative overperformance of the power setpoint value, an expanded working range of the battery power plant is obtained, which can be utilized for optimizing the state of charge of the battery power plant.

Since conventional technical storage units only can provide limited power gradients in the provision of control power, minimum requirements for the provision of control power are specified by the operators of the energy distribution networks, so that the power setpoint value can be fulfilled with a virtually delay-free step response, but on the other hand the general minimum requirements are to be fulfilled via the rate of change in power. This results in an admissible working range for reaching the nominal power setpoint value at a quasi-stationary maximum frequency deviation.

In the Federal Republic of Germany, for example, the minimum power gradient from the technical regulations "TransmissionCode 2007" results from the requirement that at a quasi-stationary maximum frequency deviation the nominal power of the control unit must be reached after 30 seconds at the latest. This minimum requirement for the rate of change in power also applies for small changes of the grid frequency. Due to the great speed of a battery power plant in the provision of power, a scope is obtained for the gradient provision when providing control power, which can be utilized for charging or discharging and hence for optimizing the state of charge of the battery power plant.

Correspondingly, the transfer strategy of the increased transfer power gradient utilizes the admissible period for reaching a setpoint of the power which is released to the energy distribution network or taken up by the energy distribution network, due to the ability for realizing a transfer power gradient higher than the required transfer power gradient in such a way that for charging the battery power plant with rising grid frequency a large transfer power gradient is used, and with decreasing grid frequency a small transfer power gradient is used, and for discharging the battery power plant with decreasing grid frequency a large transfer power gradient is used and with rising grid frequency a small transfer power gradient is used.

By setting the degree of the overperformance of the power transfer, the measure of the increased transfer power gradient, the selection of the most favorable value of the grid frequency within the specified detection interval and/or the offset added to the measured grid frequency or subtracted from the measured grid frequency in dependence on the state of charge of the battery power plant, the power transfer between the battery power plant and the energy distribution network can be set steplessly, so to speak, even with a stepped assessment of the determined state of charge of the battery power plant in relation to a specifiable state of charge from very low to very high.

In the assessment of the state of charge of the battery power plant, the criterion "neutral" is used for an optimum state of charge of the battery power plant. At an increased state of charge deviating from the neutral state of charge of the battery power plant, the criteria "neutral to high", "high", "high to very high" and "very high" are used, and at a reduced state of charge deviating from the neutral state of charge of the battery power plant the criteria "neutral to low", "low", "low to very low" and "very low" are used and in dependence on the respective criterion one or more of the above-described transfer strategies are employed.

An apparatus for carrying out the method should realize a specifiable electric behavior by a battery power plant, which provides for using suitable operating concepts for providing grid services such as a primary control power.

Correspondingly, a battery power plant which provides system services in an energy distribution network includes
several battery strings connected in parallel,
a converter system which is connected with the energy distribution network via a transformer,
a converter controller controlling the converter system and receiving and processing measured values from the converter system, and
a battery power plant management system forming the central control level for the battery power plant, which via a communication interface receives the requirements concerning at least one physical quantity of the energy distribution network as provided by an energy distribution management system and via a transducer is connected with the energy distribution network for detecting the at least one physical quantity of the energy distribution network.

Preferably, the battery strings contain several DC battery modules which via power switches are connected in parallel to at least one DC voltage collecting line connected with the converter system.

The converter system for example contains an inverter connected with a feed-in point of the energy distribution network via the transformer and several DC voltage converters or DC/DC-converters, which each are connected to a DC voltage collecting line for several battery strings connected in parallel.

Depending on the battery technology or different marginal conditions such as the voltage swing of DC battery modules depending on the state of charge or the necessary intermediate circuit voltage for the output voltage of the inverters, different topologies are obtained for converters and battery strings or battery modules.

Alternatively, two battery modules containing several battery strings connected in parallel can each be connected with an inverter, and the inverters can be connected to the primary windings of a three-winding transformer connected with the power bus bar on the secondary side.

In a further variant, several battery modules are connected in parallel to a DC voltage collecting line via power switches, which collecting line is connected with the energy distribution network via an inverter without controlled DC voltage intermediate circuit.

In a preferred embodiment, the battery power plant operates as power source and power drain, wherein the power released by the battery power plant to the energy distribution network or taken up from the energy distribution network is controlled in dependence on the grid frequency of the energy distribution network.

For detecting the state of charge (SOC) of the battery strings, the battery power plant management system is bidirectionally connected with a battery management system associated to the battery strings and the power switches.

Exemplary embodiments shown in the drawing will provide a detailed explanation of the ideas underlying the invention and variants of the invention to be derived therefrom. In the drawing:

FIG. 3 shows a schematic representation to explain the transfer strategy of the increased frequency measurement accuracy;

FIG. 5 shows a schematic representation to explain the transfer strategy of the addition or subtraction of an offset to the power setpoint value;

FIG. 7 shows a schematic representation of the resultant power band of a primary control characteristic with increased static frequency measurement resolution and overperformance of the power transfer;

FIG. 8 shows a flow diagram of the use of various power transfer strategies in dependence on a stepped or stepless assessment or detection of the state of charge of a battery power plant; and FIG. 9 shows a schematic representation of the use of various power transfer strategies in dependence on a stepped assessment of the state of charge of a battery power plant.

Figure 1:
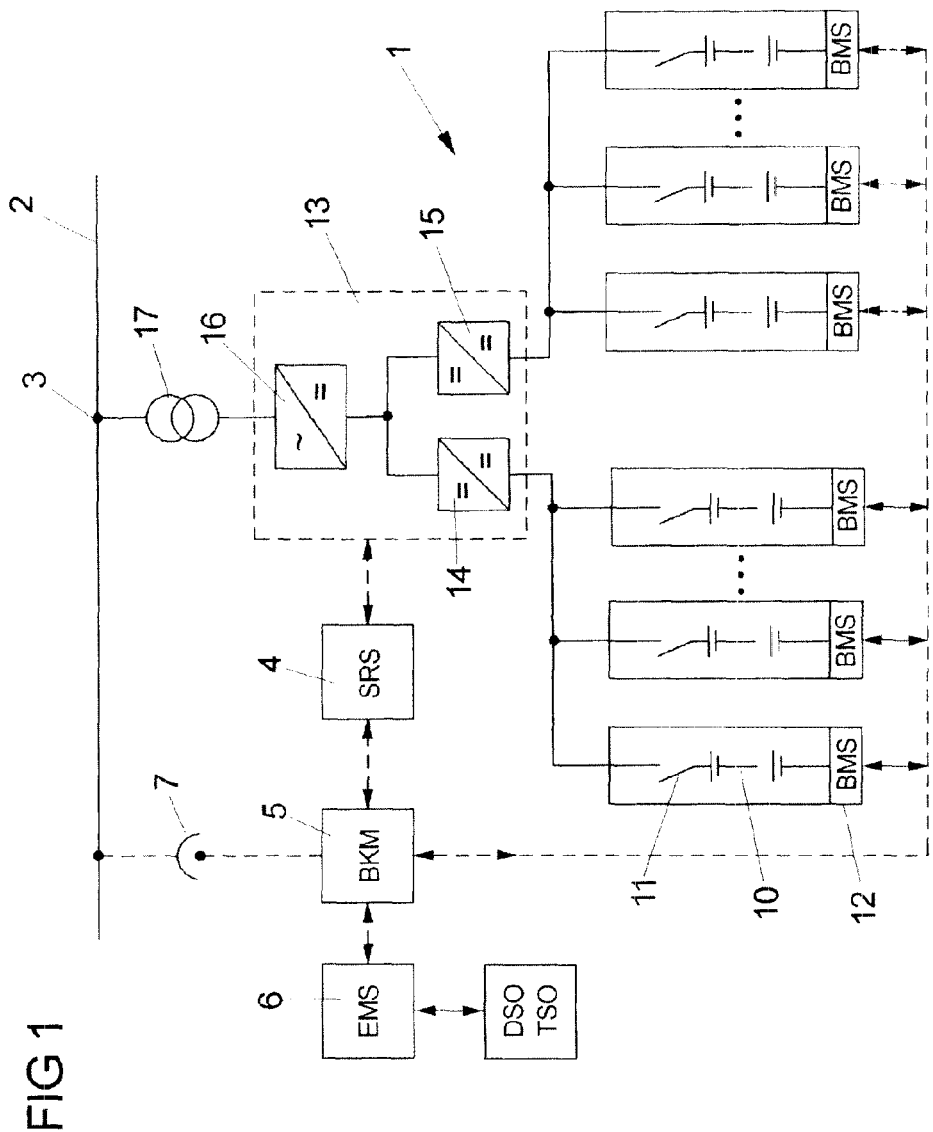
FIG. 1 shows a block circuit diagram of the primary power control of an energy distribution network by a battery power plant connected to a point of common coupling.

FIG. 1 shows a block circuit diagram of a primary power control of an energy distribution network 2 by a battery power plant 1, which takes up electric energy from the energy distribution network 2 or releases the same to the energy distribution network 2. The term "energy distribution network" relates to a high-voltage transmission network or a medium-voltage distribution network, wherein a battery power plant 1 connected to a distribution network at medium-voltage level can provide system services such as the primary power control in the high-voltage transmission network also directly via the distribution network level.

The battery power plant 1 includes a plurality of battery strings 10 which each contain a plurality of series-connected batteries and a switch 11 in the connection of the battery strings 10 with a converter system 13, via which the battery strings 10 are energetically coupled with the energy distribution network, so that the battery power plant 1 can feed electric energy into the energy distribution network 2 or take up electric energy from the energy distribution network 2, for example for controlling the frequency of the energy distribution network 2.

Each battery string 10 includes a battery management system 12 which among other things detects the state of charge (SOC) of the batteries and stores the same as required. In the schematic representation according to FIG. 1, the line connections for the transmission of electric energy are shown in continuous lines and the control connections between the individual blocks are shown in broken lines. The individual battery strings 10 each can contain identical or different battery types, wherein the battery management system 12 takes account of the specific properties of the respective type of battery when matching the batteries.

In this exemplary embodiment, the converter system 13 contains two DC voltage converters or DC/DC-converters 14, 15, which are bidirectionally connected each with N battery strings 10 connected in parallel, and are likewise bidirectionally connected with an inverter 15 which via a transformer 17 is connected to a feed-in point 3 of the energy distribution network 2.

For actuating the DC voltage converters 14, 15 and the inverter 16 and for detecting and processing sensor signals from the converter system 13 a converter controller 4 is provided, which in turn receives control signals from a battery power plant management system 5 and for example emits ready signals to the battery power plant management system 5.

Via a transducer 7, the battery power plant management system 5 is connected with the energy distribution network 2 for example for detecting the grid frequency of the energy distribution network 2. Via the converter system 13 and the transformer 17, the battery power plant management system 5 furthermore is bidirectionally connected with the battery management systems 12 of the battery strings 10 for inquiring for example the state of charge of the individual battery strings 10 and for actuating the switches 11 of the battery strings 10 for releasing energy to the energy distribution network 2 or for taking up energy from the energy distribution network 2.

The battery power plant management system 5 likewise is bidirectionally connected with a superordinate energy distribution management system 6, which among other things monitors the energy distribution network 2, i.e. the high-voltage transmission network and/or the medium-voltage distribution network. A typical signal of the superordinate energy distribution management system 6 emitted to the battery power plant management system 5 is a request for controlling the grid frequency by taking up or releasing energy from the energy distribution network 2 or to the energy distribution network 2.

The energy distribution management system 6 likewise is bidirectionally connected with a distribution network operator and transmission network system operator 8.

When operating a battery power plant 1 in the primary control, the battery power plant 1 is coupled with the energy distribution network 2 at the feed-in point or point of common coupling 3, in order to provide a specified grid system service. The detection, control and regulation of the physical quantities of the energy distribution network 2 necessary for providing the grid system service is subject to temporal and/or accuracy-related requirements which are adapted to the capacity of units currently in primary control use, such as steam power plants, diesel generators, flywheels or the like. Since battery power plants 1 differ from these units with regard to their greater speed and accuracy as well as controllability, there are scopes for the provision of power by battery power plants 1, which according to the invention are utilized for maintaining an optimum or neutral state of charge of the battery power plants 1. The methods fulfilling a grid system service are based

- on measurement and transmission methods which are more accurate and faster than the limit values specified for detecting the physical quantities necessary for providing the grid system service, and/or
- on regulation and/or control methods of the physical quantities of the battery power plant, which are more accurate and faster than the requirements concerning the provision of the grid system service.

The primary power control by a battery power plant 1 and the control of the state of charge of the battery power plant 1 will be explained in detail below.

By selectively utilizing the difference between the required temporal and/or accuracy-related detection of the physical quantities and the detection actually provided by the battery power plant 1 and the difference between the required temporal and accuracy-related provision of control power by the battery power plant 1 and the provision of control power actually provided by the battery power plant 1, it is possible to both fulfill the grid system service and to optimize the state of charge of the battery power plant 1, for whose control three strategies are applicable in principle, namely charging, discharging and a neutral behavior. The state of charge of the battery power plant 1 decides on which of these three strategies each is to be applied. For example, the rule can be that at a state of charge SOC≥90% discharging,
at a state of charge 90% >SOC≥60% a neutral behavior, and
at a state of charge 60% >SOC charging of the battery power plant 1 is to be effected. For providing the primary control power by taking account of the respective state of charge of the battery power plant 1 in particular the scopes resulting from the below-mentioned requirements concerning the provision of control power are suitable:

A first transfer strategy, which is not shown in the drawing, consists in detecting the physical quantity due to the use of a corresponding measurement and transmission method faster than specified, so that with the transfer strategy of the "best frequency" the lowest or highest frequency each in a specified time interval is utilized in the determination of the power transfer between battery power plant 1 and energy distribution network 2 for additionally supporting the battery charging management. For example, at a very low state of charge of the battery power plant 1 the highest frequency within the time interval can be utilized for providing primary control power and for charging the battery strings 10 of the battery power plant 1 or at a very high state of charge the lowest frequency within the time interval can be utilized for providing primary control power and for discharging the batteries of the battery power plant 1, whereas at a state of charge reaching from very low to very high the current frequency is used for determining the primary control power.

Alternatively or in addition to the transfer strategy of the "best frequency", the transfer strategy of the faster measurement frequency or higher detection speed can be utilized for optimizing the state of charge of the battery power plant 1.

Whereas due to their sluggishness in the reaction to changes in frequency an increased detection rate of the grid frequency generally is not relevant for conventional power plants, a higher detection rate of the frequency and hence a change in frequency is found to be expedient for battery power plants with their distinctly higher speed of reaction for use both for a faster stabilization of the magnitude of the grid frequency to be controlled and thus of the total amount of the control energy to be provided and for controlling the state of charge of the battery power plant. However, a selective sluggishness in the reaction to changes in frequency must not exceed a minimum reaction time or maximum sluggishness as requested by regulatory specifications.

When it is requested, for example, that for the provision of primary control power a power plant must react to a change in frequency at least within 2 seconds, and when the battery power plant can detect the grid frequency with a detection speed of 100 ms and react thereto within 100 ms, the battery power plant can make use thereof by immediately reacting to a frequency favorable for the state of charge or, however, by still "waiting" as to whether within the minimum reaction time of 1.8 seconds an even more favorable frequency is measured, which then is used for the control.

Figure 2:
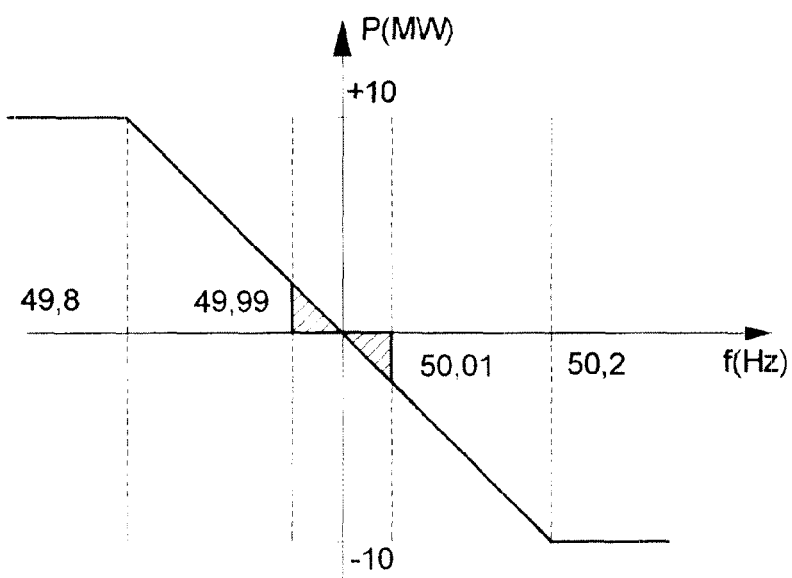
FIG. 2 shows a schematic representation of the admissible working range when utilizing a deadband of the accuracy of the frequency measurement during the provision of control power by the battery power plant.

A second transfer strategy schematically shown in FIG. 2 with reference to the characteristic curve P(f) of the power P of the battery power plant 1 in dependence on the grid frequency f results from a tolerance band of ±0-10 mHz for example regarded as admissible in the accuracy of the detection of the grid frequency f, from which a hatched working range results for the provision of control power and hence can contribute to the support of the battery charging management, when an accuracy of the frequency measurement distinctly higher than the ±10 mHz prescribed for the energy distribution network 2 is ensured. This provides for subtracting an offset of up to −9 mHz from the detected grid frequency or for adding an offset of up to +9 mHz to the detected grid frequency f for the respective support of the battery charging management at a detection accuracy of ±1 mHz.

This method differs from other methods which likewise utilize an increased measurement accuracy, in that instead of a sliding variable deadband an offset is used for the provision of primary control power, which subsequently will be explained in detail in FIG. 3 with reference to the schematic representation of the power output or power input $P/P_{nom}$ based on a nominal power in dependence on changes in frequency $\Delta f$.

For example, when a battery power plant provides the power $P(F_0)$ at a time $t_0$ at the frequency $F_0$ according to the frequency-power characteristic curve and when the frequency changes to a value $F_1$, wherein $F_0 > F_1$ and $|F_0 - F_1| < \Delta_m$, with $\Delta_m$ of the minimum measurement accuracy, and when the control power $P(F_1)$ at the frequency $F_1$ to be provided according to the frequency-power characteristic curve is unfavorable for the current and desired state of charge of the batter power plant, a control based on a sliding deadband method would maintain the power setpoint value $P_0$ unchanged, when a change in frequency lies within the range of the sliding deadband, or utilize the control power $P(F_1)$ corresponding to the new frequency $F_1$.

A control based on the offset method described here, on the other hand, would use the setpoint value $P(F_1 + \Delta_m)$, since $F_1 + \Delta_m > F_0$ and thus $P(F_1 + \Delta_m)$ also is more favorable for the current and desired state of charge of the battery power plant than the power $P_0$.

It should be noted that when using the offset, the frequency is not pushed above or below the nominal frequency, i.e. there is used a method other than a grid-supporting method.

Due to measurement inaccuracies, however, it should not occur that an apparently over-oder undersynchronous grid condition is detected, which however does not correspond to reality. This might occur, for example, when the measured frequency is close to the setpoint frequency in an over-oder undersynchronous range, and the range of the measurement inaccuracy extends beyond the setpoint frequency into the opposite range.

This can safely be excluded in that a non-usable deadband range is set around the setpoint frequency, which corresponds to the height of the measurement inaccuracy. For example, when the measurement inaccuracy is about ±1 mHz, the deadband at a setpoint frequency of 50 Hz can be utilized in conformity with the system in the positive range from a measured value of 50.001 and in the negative range from a measured value of 49.999 Hz, wherein a system-compliant behavior is to be ensured, which at a positive primary control power demand does not permit a negative primary control power provision and vice versa.

For the provision of primary control power, the battery power plant management system 5 can utilize the tolerances schematically shown in FIGS. 4 to 7, which are specified by the operator of an energy distribution network 2.

As in the provision of primary control power conventional power plants only can provide limited power gradients, the minimum requirements for the provision of control power are applicable, which are schematically shown in FIG. 4 with reference to the course of the power P and the frequency f over the time t.

Figure 4A:
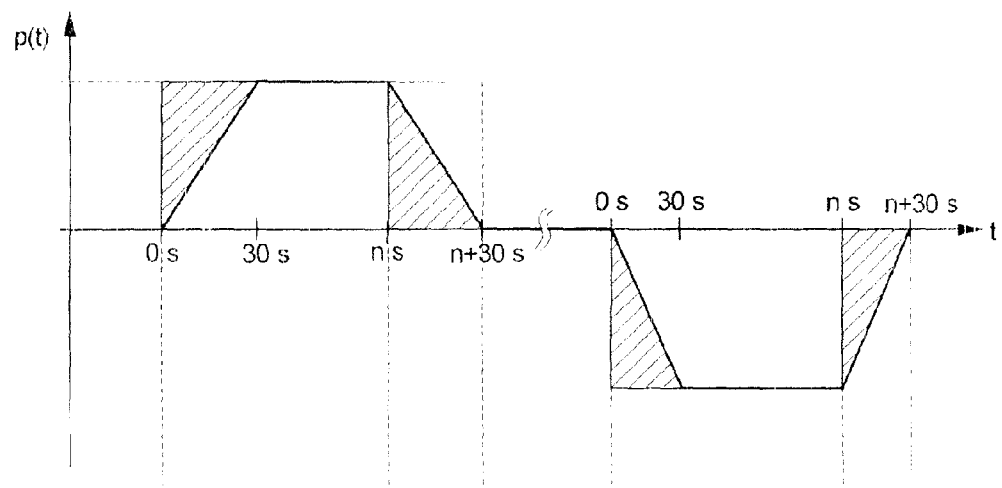
FIG. 4 shows a schematic representation of the allowed working range when utilizing an increased transfer power gradient.
Figure 4B:
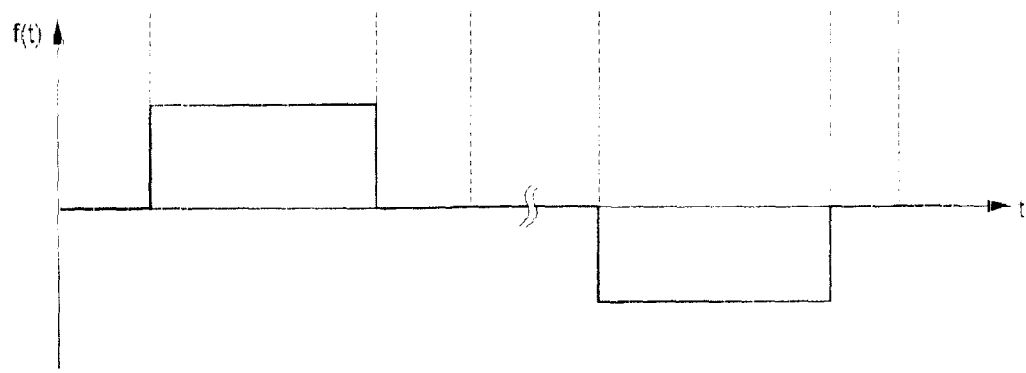

According to FIG. 4B, the setpoint value of the power P in dependence on the frequency f as required by the energy distribution network 2 or the energy management system 7 can be fulfilled with an ideal delay-free step response. In addition, as minimum requirement for the rate of change in power it is applicable for example in Germany that the nominal power $P_n$ must be reached after 30 seconds at the latest, and hence a minimum rate of change in power of $P_n/30$ s is obtained. This results in an admissible working range for reaching the target or setpoint value as shown hatched in FIG. 4A, which for all technical units providing control power leaves a scope for gradient provision, so that as a result of the fast provision of primary control power by the battery power plant 1 the battery charging management can additionally be supported.

Another possibility for supporting the battery charging and discharging management utilizes the high accuracy of the battery power plant 1 in the provision of primary control power. This will be explained in detail with reference to the schematic representation of the power output or power input $P/P_{nom}$ based on a nominal power in dependence on frequency changes $\Delta f$ according to FIG. 5.

When an accuracy of the control power to be provided is requested with 1% of the nominal control power and the battery power plant is able to provide power with an accuracy of 0.1% of the nominal control power, the battery power plant can utilize the resulting difference of 0.9% of the nominal control power for optimizing the state of charge. When the power plant for example would have to provide a power $P(F_1)$ and a low power would be more favorable for the state of charge, the battery power plant also might provide a power $P'=P(F_1)-1,9*P_{nom}$, wherein $P_{nom}$ is the nominal power. The same applies for a higher power more favorable for the state of charge, so that the power P' to be provided according to FIG. 5 lies within the range $P'=P(F_1)$ ±ΔP.

The transfer strategy of utilizing the difference between required control accuracy and possible control accuracy thus leads to a power offset for the control power, which likewise can be utilized in dependence on the current state of charge of the battery power plant. The usable offset can both be constant, e.g. when the control accuracy is required in dependence on the nominal power of the power plant, or can also be varied dynamically, if the control accuracy is required in relation to the actual power of the battery power plant. When using this method, care should however be taken that the power is not pushed above or below the power at nominal frequency.

Figure 6:
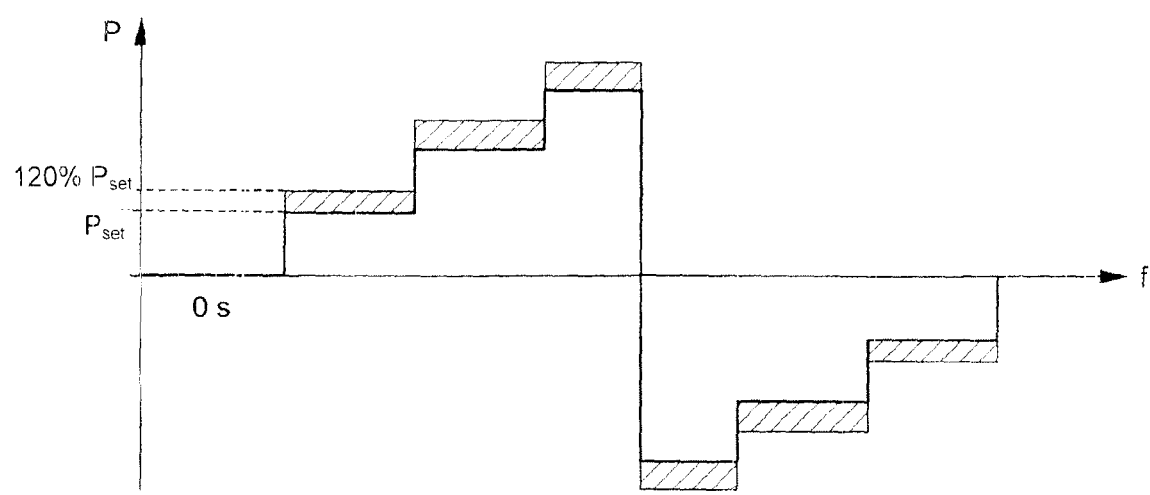
FIG. 6 shows a schematic representation of the allowed working range when utilizing an overperformance of the power transfer.

FIG. 6 schematically shows the requirements concerning the accuracy of the provision of power with reference to a P(f) characteristic curve.

Since in the provision of control power conventional technical units generally are not arbitrarily precise in the fulfillment of setpoint values, it is regarded as minimum requirement that the specifications corresponding to the P(f) characteristic curve must be provided. An underperformance is not admissible, but the power can amount to up to 120% of the requirements according to the P(f) characteristic curve and hence are exceeded ("overachievement").

In a bold continuous line FIG. 6 shows the response behavior of a battery power plant 1 and in a thin continuous line the admissible overperformance in the provision of power, which results in an admissible working range shown hatched, which can be utilized for supporting the battery charging and discharging management.

With reference to a primary control characteristic curve with a control power based on a nominal control power over the deviation of the actual frequency f from a setpoint frequency $f_0$, FIG. 7 shows the power band for the provision of primary control power and for supporting the battery charging management of a battery power plant 1 resulting from an increased static frequency measurement resolution and a possible overperformance in the provision of primary control power.

The nominal control statics shown with a continuous line does not require a control power at a frequency deviation $f-f_0$ in the range between −10 and +10 mHz. When the actual value of the grid frequency f decreases, the control power demand up to a frequency deviation $f-f_0$ of −200 mHz rises linearly up to the nominal control power. With rising actual value of the grid frequency f and hence increasing frequency deviation $f-f_0$ the power to be taken up from the energy distribution network rises linearly up to the nominal control power at a frequency deviation $f-f_0$ of +200 mHz.

Due to the larger temporal and accuracy-related detection of the grid frequency by a battery power plant 1—as explained above in detail—a nominal control statics shown in a broken line is obtained with an offset of ±9 mHz, which can be added to the nominal control statics or can be subtracted from the nominal control statics, when the accuracy of the detection of the grid frequency is ±1 mHz.

In a dash-dotted line an overperformance of the provision of power is graphically illustrated, which maximally should lie 20% above the nominal control statics. At a frequency deviation $f-f_0$ of −10 mHz to −200 mHz it rises up to 1.2 times the control power or drops from the frequency deviation $f-f_0=10$ mHz to 200 mHz down to 1.2 times the value of the control power.

From the increased static frequency measurement resolution and possible overperformance in the provision of power the resultant power band shown in FIG. 7 is obtained, which is limited by the control statics shown in a dotted line with an increased frequency measurement resolution and overperformance as well as by the nominal control statics with increased frequency measurement resolution, which is shown in a broken line. Within the scopes resulting from the resultant power band the state of charge SOC of the battery power plant 1 thus can be optimized, i.e. be brought to a neutral value, by charging or discharging the battery power plant 1.

This will be explained in detail below with reference to the flow diagram shown in FIG. 8 and the primary control strategy shown in FIG. 9.

The control scheme shown in FIG. 8 with reference to a flow diagram or the primary control strategy shown in FIG. 9 starts with the determination of the state of charge SOC of the battery power plant 1 and a subsequent assessment of the state of charge SOC with $S_1$ as very low, $S_2$ as low to very low, $S_3$ as low, $S_4$ as neutral to low, $S_0$ as neutral, $S_5$ as neutral to high, $S_6$ as high, $S_7$ as high to very high, and $S_8$ as very high, so that $$S_1 < S_2 < S_3 < S_4 < S_0 < S_5 < S_6 < S_7 < S_8 \qquad 5$$

applies for the assessment of the state of charge SOC.

In the illustrated example, the strategy of the "best frequency" can be employed as a result of the great measurement speed of the battery power plant 1 at a very low (SOC≤$S_1$) or very high state of charge (SOC≥$S_8$). Corresponding to decision box P2, the highest frequency within the measurement interval is used at a very low state of charge (SOC≤$S_1$), or at a very high state of charge (SOC≥$S_8$) corresponding to decision box P3 the lowest frequency within the measurement interval is used when providing the primary control power. At states of charge $S_2$≤SOC≤$S_7$, the current frequency is used in the determination of the primary control power demand corresponding to decision box P1.

In the strategy of subtracting an offset from the measured frequency or of adding an offset to the measured frequency as a result of the high measurement accuracy in use of a battery power plant 1 in the primary control power, an offset dependent on the measurement accuracy can be added to the detected grid frequency when determining the primary control power demand at a very low or very low to low state of charge (SOC≤$S_2$) corresponding to decision box P4. Alternatively, at a very high or high to very high state of charge (SOC≥$S_7$) corresponding to decision box P5, an offset dependent on the measurement accuracy can be subtracted from the detected grid frequency when determining the primary control power demand.

With the "relevant" frequency determined by using the two aforementioned strategies the respective primary control power demand is determined with reference to the P(f) characteristic curve corresponding to decision box P6.

When transferring the control power between the battery power plant 1 and the energy distribution network 2, the working range resulting from the difference between actual and requested height and speed of a power transfer can be utilized for supporting the battery charging management.

Corresponding to decision box P7, the strategy of the overperformance by providing for example 120% of the charging power determined above can be used at a very low, very low to low and low state of charge (SOC≤$S_3$) and at a very high, very high to high and high state of charge (SOC≥$S_6$).

Corresponding to decision box P8, when the state of charge of the battery power plant is unfavorable, a power offset can be subtracted from the power setpoint value in the SOC range S1 to S4, and corresponding to decision box P9 a power offset can be added to the power setpoint value in the SOC range S5 to S8.

Corresponding to decision box P10, the strategy of the increased power gradient, i.e. an increased rate of change in the provision of primary control power, can be used for example at a very low to neutral to low state of charge (SOC≤$S_2$) or at a very high to neutral to high state of charge (SOC≥$S_7$) (block P11).

Corresponding to decision box P11, the power thus defined and determined is used for primary control and for supporting the battery charging management.

As an alternative to a stepped assessment of the determined state of charge of the battery power plant 1, a stepless determination of the primary control power can be made with support of the battery charging management, by determining and setting the degree of overperformance of the power transfer and/or the measure of the increased transfer power gradient and/or the selection of the most favorable value of the grid frequency within the specified detection interval and/or the power offset due to the increased accuracy in the provision of control power and/or the offset added to the measured grid frequency or subtracted from the measured grid frequency in dependence on the respective state of charge of the battery power plant 1.

LIST OF REFERENCE NUMERALS

1 battery power plant
2 energy distribution network
3 feed-in point
4 converter controller
5 battery power plant management system
6 energy distribution management system
7 transducer
8 distribution network operator and transmission network system operator
10 battery strings
11 switch
12 battery management system
13 converter system
14, 15 DC voltage converter or DC/DC-converter
16 inverter
17 transformer
SOC, $S_0$-$S_8$ state of charge of the battery power plant
f actual frequency
$f_0$ setpoint frequency
P power
$P_n$ nominal power
t time
$\Delta_m$ minimum measurement accuracy
$\Delta_f$ measurement accuracy of the grid frequency

The invention claimed is:

1. A method for controlling a battery power plant, comprising:
   determining a state of charge of one or more battery strings of the battery power plant, the battery power plant coupled to an energy distribution network;
   detecting a physical quantity of the energy distribution network with a detection speed that is greater than a threshold detection speed; and
   controlling a transfer of power between the battery power plant and the energy distribution network based on a difference between the detection speed and the threshold detection speed.

2. The method of claim 1, further comprising:
   detecting the physical quantity of the energy distribution network with a detection accuracy that is greater than a threshold detection accuracy; and
   controlling the transfer of power between the battery power plant and the energy distribution network further based on a difference between the detection accuracy and the threshold detection accuracy.

3. The method of claim 1, further comprising:
   determining a rate of change of the transfer of power between the battery power plant and the energy distribution network; and
   determining an amount of power to transfer between the battery power plant and the energy distribution network based on a difference between the rate of change and a threshold rate of change, wherein the rate of change is greater than the threshold rate of change.

4. The method of claim 1, wherein the physical quantity is a grid frequency, and wherein each battery string of the one or more battery strings includes a plurality of batteries coupled in series or in parallel.

5. The method of claim 1, further comprising:
assessing the state of charge of the one or more battery strings relative to a state of charge criterion; and
determining, based on assessing the state of charge of the one or more battery strings, a power transfer strategy for the transfer of power between the battery power plant and the energy distribution network.

6. The method of claim 5, wherein the power transfer strategy comprises selecting, based on the state of charge of the one or more battery strings, a value of the physical quantity within a detection interval, the detection interval determined based on the difference between the detection speed and the threshold detection speed.

7. The method of claim 6, wherein a maximum value of the physical quantity detected during the detection interval is used for controlling charging of the battery power plant and a minimum value of the physical quantity detected during the detection interval is used for controlling discharging of the battery power plant.

8. The method of claim 5, wherein the power transfer strategy comprises over performing the transfer of power.

9. The method of claim 5, wherein the power transfer strategy comprises subtracting or adding an offset value from or to a measured grid frequency.

10. The method of claim 5, wherein the power transfer strategy comprises increasing a power transfer gradient associated with the battery power plant, the increased power transfer gradient corresponding to a particular rate of change of power to be provided by the battery power plant, and wherein the particular rate of change of power to be provided by the battery power plant is greater than a threshold rate of change of power to be provided by the battery power plant.

11. The method of claim 5, wherein the power transfer strategy comprises adding or subtracting an offset frequency value to or from a measured grid frequency, and wherein the offset frequency value is selected based on a measurement accuracy of the measured grid frequency.

12. The method of claim 5, wherein the power transfer strategy comprises:
adding an offset frequency value to a measured grid frequency during charging of the battery power plant; and
subtracting the offset frequency value from the measured grid frequency during discharging of the battery power plant, wherein a threshold measurement accuracy of the grid frequency is greater than a measurement accuracy of the grid frequency, and wherein the offset frequency value is equal to a difference between the threshold measurement accuracy and the measurement accuracy.

13. The method of claim 12, further comprising setting the state of charge of the battery power plant based on a difference between the threshold measurement accuracy of the grid frequency and the measurement accuracy of the grid frequency, and wherein the threshold measurement accuracy and the measurement accuracy comprise a plus or minus offset value.

14. The method of claim 5, further comprising:
applying a first power transfer gradient during charging of the battery power plant when a grid frequency is increasing and during discharging of the battery power plant when the grid frequency is decreasing; and
applying a second power transfer gradient that is less than the first power transfer gradient during charging of the battery power plant when the grid frequency is decreasing and during discharging of the battery power plant when the grid frequency is increasing.

15. A system for controlling a battery power plant, the system comprising:
a plurality of battery strings electrically coupled in parallel with each other;
a power converter system electrically coupled to the plurality of battery strings and configured to be coupled to an energy distribution network;
a controller coupled to the power converter system and configured to process signals received from the power converter system; and
a battery power plant management system electrically coupled to each of the plurality of battery strings and configured to be coupled to the energy distribution network, the battery power plant management system configured to:
determine a state of charge of one or more battery strings of the plurality of battery strings;
detect a physical quantity of the energy distribution network with a detection speed that is faster than a threshold detection speed; and
control a transfer of power between the battery power plant and the energy distribution network based on a difference between the detection speed and the threshold detection speed.

16. The system of claim 15, wherein each of the plurality of battery strings includes one or more direct current (DC) battery modules coupled in parallel to at least one DC voltage collecting line via a power switch.

17. The system of claim 16, wherein the power converter system includes an inverter coupled to a feed-in point of the energy distribution network.

18. The system of claim 17, wherein the inverter is coupled to the feed-in point of the energy distribution network via a transformer and one or more DC voltage converters or DC/DC converters.

19. The system of claim 15, wherein each of the plurality of battery strings is configured to provide power to or absorb power from the energy distribution network based on a grid frequency of the energy distribution network.

20. The system of claim 15, the battery power plant management system further configured to:
delay, based on the difference between the detection speed and the threshold detection speed, controlling the transfer of power between the battery power plant and the energy distribution network based on a first value of the physical quantity detected at a first time;
detect, at a second time within a detection interval, a second value of the physical quantity of the energy distribution network with the detection speed, the detection interval based on the first time and the difference between the detection speed and the threshold detection speed;
determine whether the first value of the physical quantity or the second value of the physical quantity is a more favorable value of the physical quantity; and
control the transfer of power between the battery power plant and the energy distribution network based on the more favorable value of the physical quantity.

* * * * *